Patented May 15, 1951

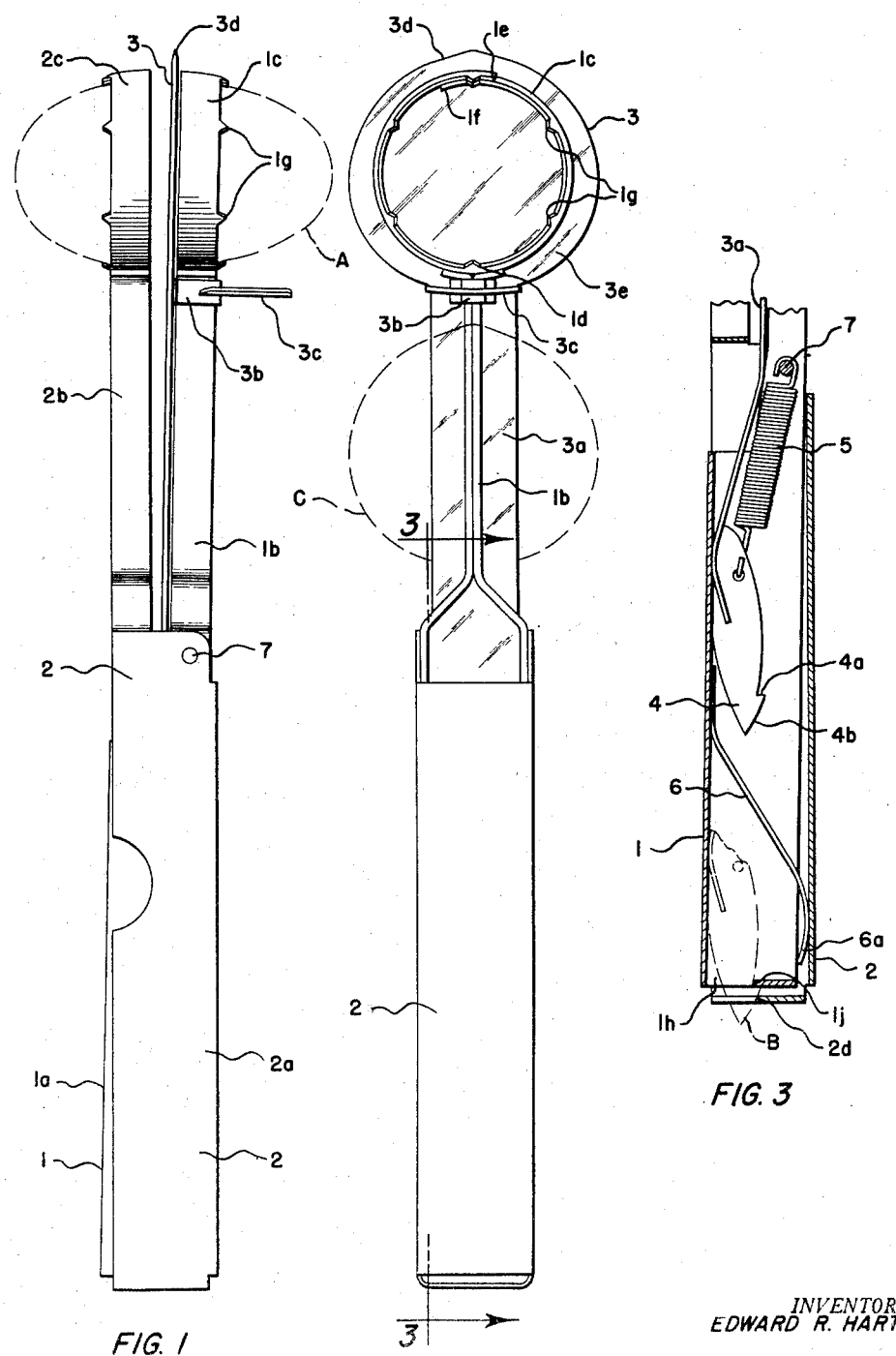

2,552,784

UNITED STATES PATENT OFFICE 2,552,784

EGG HOLDER AND OPENER WITH RECIPROCATING BLADE

Edward R. Hartin, National City, Calif.

Application March 2, 1948, Serial No. 12,516

4 Claims. (Cl. 146—2)

My invention relates to an egg holder and opener, more particularly for use in handling boiled eggs and severing the same into two halves, and the objects of my invention are:

First, to provide an egg holder of this class having a spring-loaded knife which is automatically operated to sever the egg into two halves when the handles are completely closed for holding opposite halves of the egg;

Second, to provide an egg holder and opener of this class in which the spring-loaded knife acts very rapidly and cuts the egg very cleanly into two halves and remains intermediate the two halves until one half is removed from its shell, whereupon the opener may be inverted and the knife may be retracted uncovering the remaining half which may be removed from the shell;

Third, to provide an egg holder and opener of this class in which a knife for severing the egg completely covers the area of the egg cut off so that one half of the egg may be inverted and retained in its shell while the other half of the egg is being removed from its shell;

Fourth, to provide an egg opener of this class which is readily adapted for use in holding eggs of various sizes;

Fifth, to provide an egg opener of this class which is useful in picking hot eggs out of the boiling water, severing the same, and retaining the shell while the contents of the egg are being removed therefrom;

Sixth, to provide an egg holder and opener of this class which saves much time and discomfort in the handling of hot eggs; and Seventh, to provide an egg holder and opener of this class which is very simple and economical of construction, efficient in operation, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon forming a part of this application in which:

Fig. 1 is a side elevational view of my egg holder and opener showing by dash lines an egg held in connection therewith, Fig. 2 is the top or plan view of my egg holder and opener showing by dash lines the retracted position of the severing knife thereof, and Fig. 3 is a fragmentary sectional view taken from the line 3—3 of Fig. 2, showing by dash lines the varying position of the knife holding latch thereof.

Similar characters of reference refer to similar parts and portions throughout the several views of the drawings.

The handles 1 and 2, knife 3, latch 4, springs 5 and 6, and the pin 7 constitute the principal parts and portions of my egg holder and opener.

The handles 1 and 2 are each channel shaped in cross-section at their hand engaging portions 1a and 2a and are pivoted together on the pin 7 extending through opposed flanges on each of the handle members 1 and 2. The forward ends of these handle members 1 and 2 are formed of the side portions of the handle members 1 and 2 into shanks 1b and 2b respectively. These shanks 1b and 2b are substantially less than half the depth of the handles 1 and 2, as shown best in Fig. 1 of the drawings. Secured on the outer extended end of each of the shank portions 1b and 2b is an egg holding band adapted to engage eggs of varying diameter. Inasmuch as these egg holding bands are substantially identical in form the egg holding band 1c in connection with the arm 1 will be described in detail. This band 1c is secured to the extending end of the shank 1b at the middle portion of said band 1c, and the opposite ends 1e and 1f are overlapped, as shown in Fig. 2 of the drawings, and arranged to reciprocate relative to each other, permitting expansion of the band 1c in order to snugly fit eggs of varying diameter. Positioned around the outer edge and directed inwardly are the integral teeth 1g which frictionally engage the shell of eggs placed in the band 1c. It will be noted that the band 1c is conforming to the shape of an egg, as indicated by dash lines A, axially thereof, so that the inner edge of the band 1c is substantially larger in diameter than the outer edge thereof from which the teeth 1g extend. The band 2c is directly opposite the band 1c and is movably mounted on the shank 2b of the handle 2. The knife 3 is reciprocally mounted intermediate the shank portions 1b and 2b of the handles 1 and 2, and is provided with loop-shaped guide portion 3b surrounding the shank portion 1b of the handle 1 to which is connected a finger plate 3c adapted to be grasped by the fingers of the operator. The outer end of the knife 3 is provided with a sharp edge 3d and this outer end 3e is substantially larger in diameter than the bands 1c arranged to completely cover the diameter of severed eggs as indicated by dash lines A, in Fig. 1 of the drawings. Connected to this portion 3e of the knife 3 is a straight, flat shank 3a which extends backwardly into the handle portions 1a and 2a of the handles 1 and 2, as shown in Fig. 3 of the drawings. To the rear end of the shank 3a is connected the latch 4 provided with a hook portion 4a of the buttress type adjacent to which is a curved cam portion 4b. The spring 5 interconnects the pin 7 and the latch 4 urging the knife 3 from the dash line position to the solid line position as shown in Fig. 2 of the drawings when released. The rear end of the handle 1 is provided with an opening 1h therein, adjacent to which the plate edge 1j is engageable with the buttress latch portion 4a of the latch member 4, as indicated by dash lines B in Fig. 3 of the drawings. The plate spring 6 is positioned in the handle 1 and fixed thereto at one side of the shank 3a of the knife 3 and the latch 4. The opposite moveable end 6a of this spring 6 resiliently engages the inner side of the handle 2 tending to force the same in diverging relationship with the handle 1 for opening the bands 1c and 2c away from each other.

The operation of my egg holder and opener is substantially as follows:

When an egg is positioned in boiling water and it is desired to remove the same therefrom and remove the contents from the shell thereof the operator proceeds as follows:

The handle portions 1a and 2a are pivoted away from each other about the axis of the pin 7 until the bands 1c and 2c are sufficiently spread to accommodate the length of the egg therebetween as indicated by dash lines A in Fig. 1 of the drawings. The handles 1 and 2 are then pivoted into the solid line position as shown in Fig. 1 of the drawings, holding the egg A with the knife 3 retracted to the dash line position C, shown in Fig. 2 of the drawings, wherein the buttress portion 4a of the latch 4 engaging the edge 1j of the handle 1 prevents the knife 3 from contacting the egg until the handles 1 and 2 are closed whereupon the edge 2d of the handle 2 removes said buttress portion 4a from the edge 1j of the handle 1 permitting the spring 5 to force the knife 3 through the egg A intermediate the bands 1c and 2c. The handles 1 and 2 are then pivoted apart until the band 1c which is held uppermost clears the band 2c, at which time contents of the half of the egg held in the band 2c may be removed while the knife 3 retains the opposite half of the egg A in the band 1c, then the holder may be inverted so that the band 2c is uppermost and the knife 3 is retracted to its latched position, as indicated by dash lines B in Fig. 3 of the drawings, and the dash line position C in Fig. 2 of the drawings uncovering the half of the egg which is then lowermost permitting it to be relieved of its contents, whereupon the shells are then removed from the bands 1c and 2c. The overlapping relationship of opposite ends of these bands 1c and 2c provide for diametric extension thereof for accommodating various sized eggs. When it is desired to retract the knife 3 the finger engaging member 3c is forced backwardly toward the handle portions 1a and 2a, causing the buttress portion 4a of the latch 4 to engage the edge 1j of the handle 1 and causing the tension spring 5 to be extended. The knife 3 is, as hereinbefore described, automatically released for severing the egg into two pieces when the handles 1 and 2 are closed together at their rear ends which causes the edge 2d of the handle 2 to force the buttress 4a away from the edge 1j of the handle 1, whereupon the spring 5 resiliently urges the knife 3 at its end portion 3e forwardly between the bands 1c and 2c severing the egg in two pieces. It will be here noted that the enlarged diameter of the knife 3 at its end 3e provides a holder for one half of the egg after it is severed, while the other half is being relieved of its contents, thus inversion of one half of the egg does not cause the contents thereof to gravitate therefrom while removing contents of the other half, which is held in the band 2c.

Though I have shown and described a particular construction, combination and arrangement of parts and portions I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an egg holder and opener of the class described a pair of handles pivoted together intermediate their opposite ends, a knife independently secured between said handles and intermediate the extending ends of said handles, having an enlarged blade portion slightly greater than the diameter of an egg, egg-holding bands on said extending ends of the said handles at opposite sides of the plane of said knife whereby the severing of said eggs intermediate said bands by said knife indexes said enlarged blade portion with the severed halves of the egg preventing the contents of one half of the egg from being spilled when inverted, latch means in connection with the normally rearward end of said blade and a spring tending to urge said blade toward said egg-holding band.

2. In an egg holder and opener of the class described a pair of handles pivoted together intermediate their opposite ends, a knife independently secured between said handles and intermediate the extending ends of said handles, having an enlarged blade portion slightly greater than the diameter of the egg, egg holding bands on said extending ends of the said handles at opposite sides of the plane of said knife whereby the severing of said eggs intermediate said bands by said knife indexes said enlarged blade portion with the severed halves of the egg preventing the contents of one half of the egg from being spilled when inverted, latch means in connection with the normally rearward end of said blade and a spring tending to urge said blade toward said egg-holding band, said latch means including a buttress latch portion on the rear end of said blade engageable with an edge of one of said handles at the rear end thereof, said latch projecting from the rear of the handle it engages, the other of said handles having an engaging portion adapted to relieve said latch from the handle said buttress portion engages whereby said spring forces said knife forwardly when said latch is so released from its engagement with the handle contacted by said buttress portion.

3. In an egg holder and opener of the class described a pair of handles pivoted together intermediate their opposite ends, and having extending ends, a knife independently secured between said handles and intermediate the extending ends of said handles, having a reciprocally mounted enlarged blade portion slightly greater than the diameter of an egg, egg-holding bands on said extending ends of the said handles at opposite sides of the plane of said knife whereby the severing of said eggs intermediate said bands by said knife indexes said enlarged blade portion with the severed halves of the egg preventing the contents of one half of the egg from being spilled when inverted, latch means connected with the normally rearward end of said blade engageable with one of said handles and a spring tending to urge said blade toward said egg-holding band, each of said bands having overlapping edge portions reciprocally mounted relative to each other and having inwardly projecting teeth portions.

4. In an egg holder and opener of the class described a pair of handles pivoted together intermediate their opposite ends, and having extending ends, a knife independently secured between said handles and intermediate the extending ends of said handles, having a reciprocally mounted enlarged blade portion slightly greater than the diameter of an egg, egg-holding bands on said extending ends of the said handles at opposite sides of the plane of said knife whereby the severing of said eggs intermediate said bands by said knife indexes said enlarged blade portion with the severed halves of the egg preventing the contents of one half of the egg from being spilled when inverted, latch means connected with the normally rearward end of said blade engageable with one of said handles and a spring tending to urge said blade toward said egg-holding band, each of said bands having overlapping edge portions and reciprocally mounted relative to each other and having inwardly projecting teeth portions, each of said bands being larger in diameter adjacent each other than at their opposite edges.

EDWARD R. HARTIN.

REFERENCES CITED

The following references are of record in the file of this patent:

UNITED STATES PATENTS

| Number | Name | Date |
| --- | --- | --- |
| 490,133 | Berrini | Jan. 17, 1893 |
| 516,389 | Crutsinger | Mar. 13, 1894 |
| 1,666,253 | Blincoe | Apr. 17, 1928 |
| 1,889,912 | Barcelo | Dec. 6, 1932 |
| 1,955,258 | Smith | Apr. 17, 1934 |
| 2,247,016 | Halas | June 24, 1941 |

FOREIGN PATENTS

| Number | Country | Date |
| --- | --- | --- |
| 394,811 | France | Dec. 8, 1908 |
| 602,145 | France | Dec. 18, 1925 |
| 12,694 | Sweden | Nov. 8, 1900 |